United States Patent
Balachandran et al.

(10) Patent No.: US 7,274,935 B2
(45) Date of Patent: Sep. 25, 2007

(54) METHOD AND BASE STATION CONTROLLER FOR HANDOVER OF SIMULTANEOUS VOICE AND DATA SESSIONS

(75) Inventors: Kumar Balachandran, Cary, NC (US); Rajaram Ramesh, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 11/176,652

(22) Filed: Jul. 7, 2005

(65) Prior Publication Data
US 2007/0010252 A1    Jan. 11, 2007

(51) Int. Cl.
*H04Q 7/20* (2006.01)

(52) U.S. Cl. ............... 455/437; 455/436; 455/438; 455/466; 455/440; 455/442; 455/443; 455/450; 370/331; 370/332; 370/333; 370/334; 370/355

(58) Field of Classification Search .......... 455/436, 455/438, 440, 442, 443, 450, 466; 370/331, 370/332, 333, 334, 355
See application file for complete search history.

(56) References Cited

U.S. PATENT DOCUMENTS

| | | | | |
|---|---|---|---|---|
| 5,553,079 | A * | 9/1996 | Niki et al. ............. | 370/478 |
| 6,112,084 | A * | 8/2000 | Sicher et al. .......... | 370/337 |
| 6,282,182 | B1 * | 8/2001 | Pecen et al. .......... | 370/336 |
| 6,791,968 | B2 * | 9/2004 | Kotzin ................. | 370/348 |
| 6,847,821 | B1 * | 1/2005 | Lewis et al. .......... | 455/452.2 |
| 6,990,088 | B2 * | 1/2006 | Madour ................ | 370/331 |
| 6,990,342 | B2 * | 1/2006 | Raval et al. .......... | 455/436 |
| 2004/0248575 | A1 * | 12/2004 | Rajala et al. ......... | 455/436 |

OTHER PUBLICATIONS

ETSI TS 102 355 v8.4.0 (Jan. 2005); Digital cellular telecommunications system (Phase 2+); Dual Transfer Mode (DTM); Stage 2; (3GPP TS 03.55 version 8.4.0 Release 1999).
3GPP TS 23.060 v6.7.0 (Dec. 2004); 3rd Generation Partnership Project; Technical Specification Group Services and System Aspects; General Packet Radio Service (GPRS); Service description: Stage 2; (Release 6).

* cited by examiner

*Primary Examiner*—Steve M. D'Agosta

(57) ABSTRACT

A method and base station controller (BSC) in a GPRS/EDGE cellular radio telecommunication system for controlling a handover of a mobile station (MS) conducting both a circuit-switched call and a packet data session, and for rapidly reestablishing the packet data session. The BSC determines from measurement reports that a handover of the MS is imminent. The BSC sends both packet system information and Dual Transfer Mode (DTM) information relevant in the target cell to the MS prior to a handover command. When the handover is complete, the BSC may also send a pseudo cell update message to a serving SGSN. The message includes an identifier of the MS and appears to the SGSN to be from the MS. After the circuit-switched call is reconnected, the packet data session is rapidly reestablished utilizing the information sent to the mobile station prior to the handover command, and without having to send a cell update message from the MS.

34 Claims, 4 Drawing Sheets

METHOD AND BASE STATION CONTROLLER FOR HANDOVER OF SIMULTANEOUS VOICE AND DATA SESSIONS

BACKGROUND

The present invention relates to cellular radio telecommunication systems. More particularly, and not by way of limitation, the present invention is directed to a method and a base station controller (BSC) for handing over a mobile station conducting both a circuit-switched call and a packet data session, and rapidly reestablishing the packet data session.

The GSM/EDGE system is the most widely used cellular standard in the world. This system provides access to mobile telephony services using a core network that can support both circuit switched (CS) and packet switched (PS) services. While CS services are related to mobile telephony, PS services primarily deal with Internet connectivity. Details regarding the provision of CS and PS services in the GSM/EDGE system are provided in the technical specification 3GPP TS 23.060 v6.7.0 entitled, "3$^{rd}$ Generation Partnership Project; Technical Specification Group Services and System Aspects; General Packet Radio Service (GPRS); Service description; Stage 2 (Release 6)", December 2004, which is fully incorporated by reference herein.

As described in the GSM/EDGE specifications, a mobile station (MS) that participates in a circuit call is said to be in "dedicated mode" of operation. For purposes of this disclosure, an MS that is not in dedicated mode will be referred to as being in "idle mode". Likewise, an MS engaged in active packet transfer over GPRS is said to be in "packet transfer mode" or "GPRS active mode". All other MSs are in the "packet idle mode".

Within the GSM/EDGE system, an MS may be classified in one or more classes: Class A, Class B, or Class C. Class-A MSs may attach to both GPRS and other GSM services, and support simultaneous attach, activation, monitor, invocation, and traffic operations. The mobile user can make and/or receive calls on the two services simultaneously, subject to Quality of Service (QoS) requirements. A minimum of one channel shall be available for each type of service (CS and GPRS) when required.

Class-B MSs may attach to both GPRS and other GSM services, but the MS can only operate one set of services at a time. Thus, the MS must terminate an ongoing PS transaction in order to participate in a CS voice call. Class-C MSs may attach to either GPRS or other GSM services, but not both simultaneously.

In general, the GSM/EDGE network independently allocates radio resources to the CS and PS domains. This is because the Radio Resource (RR) management entity, hereafter referred to as RR, does not have an associated context for an MS unless the MS is in "dedicated mode", meaning there is either a call in progress in the circuit network or there is ongoing packet communication between the MS and the network. Moreover, the RR does not coordinate the allocation of radio resources between the CS and PS domains. Therefore, the Class-A MS must, strictly speaking, have two independent radios, since the CS allocation could be on a different carrier frequency than the PS allocation. Even if the carriers are identical, there is no guarantee that the CS and PS domains would honor the multi-slot class of the MS, which determines the combinations of timeslots on which the mobile station is capable of transmitting and receiving. Obviously, this strict interpretation of the specification causes significant problems in building MSs that allow simultaneous circuit and packet domain operation.

These problems have been addressed in the past through the introduction of a new Class-A mode known as simple Class-A or Dual Transfer Mode (DTM) and described in concept within the 3GPP technical specification ETSI TS 102 355 v8.4.0 entitled, "Digital Cellular Telecommunications system (Phase 2+); Dual Transfer Mode (DTM); Stage 2 (3GPP TS 03.55 version 8.4.0 Release 1999)", January 2005, which is fully incorporated by reference herein. DTM allows for coordination between the radio resource allocation in the CS and PS domains. Moreover, DTM allows PS domain control messages to be sent on the main Digital Control Channel (DCCH). The main DCCH for an MS during a call is the Fast Associated Control Channel (FACCH). When these PS domain control messages are sent from an MS to a Serving GPRS Service Node (SGSN), the messages are tunneled to the Base Station Subsystem (BSS), and the BSS unpacks packet domain information from the FACCH messages and forwards the corresponding PS messages to the SGSN. However, this process generally incurs a lengthy delay.

Another function related to the present invention is handover. In existing handover procedures for change of cell or location area, the CS domain takes precedence over the PS domain. In such circumstances, the packet session is suspended while the MS performs a normal handover. Packet communication is then reestablished via a cell update after the MS establishes CS communication in the new cell. This entire process may cause delays of several seconds for the PS communication, thus causing a significant loss of quality-of-service (QoS) during the process. While the GPRS network was originally designed primarily as a best-effort network, the deployment of EDGE and EGPRS, and the availability of higher data rates on competitive networks such as UMTS and CDMA2000, has made QoS more important within GSM/EDGE. In one particular application, for example, there is a need for the voice and image information being transferred simultaneously during DTM to be loosely coordinated during a handover. In the current network, the break of packet data communication of several seconds is excessively long, and interferes with user satisfaction.

FIG. 1 is a signaling diagram illustrating the flow of messages for an internal, dual mode handover in accordance with existing 3GPP standards. A mobile station (MS) 11 is communicating through a GSM/EDGE network. The network is shown to include an old (serving) base transceiver station (BTS) 12, a new (target) BTS 13, a base station controller (BSC) 14, a mobile switching center (MSC) 15, and a Serving GPRS Service Node (SGSN) 16. The MS is shown to be a dual-mode MS conducting a CS call 17 through the MSC and a PS session 18 through the SGSN.

As the MS 11 moves away from the old BTS 12 into the cell served by the new BTS 13, the BSC 14 serving the two cells may activate channels in the target cell by sending a Channel Activation message 19 to the new BTS and receiving a Channel Activation Acknowledgment message 21 in response. The BSC may then send a Handover Command message 22 requesting the MS to switch to the new BTS. At the receipt of the Handover Command message, the MS abandons the PS session 18 and initiates handover access 23 to the new BTS, obeying the handover time requirements of 3G TS 05.10 [8] clause 6 and 3G TS 04.13 [3] clause 5.2.6.

At 24, the CS connection is reestablished as a CS-only handover, and when concluded, the BSC 14 sends an RF Channel Release message 25 to the old BTS 12. The old BTS sends an acknowledgement 26 and releases the channels in the old cell. The CS call 17 then continues. If the MS 11 was in dual transfer mode in the old cell, the BSC sends a DTM Information message 27 to the MS, with information needed to resume the GPRS operation. Once the MS has the necessary information, it performs a Cell Update or RA Update procedure 28. The Cell Update procedure may be performed on the main DCCH or on a temporary block flow (TBF), as shown in FIGS. 2 and 3. If the MS also needs to (re-)establish an uplink PS session in the new cell, the GMM signaling procedure takes precedence and is performed first. Once the update procedure is performed, the PS session 18 is (re-)established.

In the case of an external, dual mode handover, the new (target) base station subsystem (BSS) is provided with the IMSI of the MS 11 and with information about the nature of the packet resources in the old (serving) cell, so that the CS resource is compatible with the PS resources that are going to be requested in the new cell (for example, a transceiver supporting AMR or EDGE, a timeslot with a free, adjacent timeslot, and the like). This information is conveyed in an Old-BSS-to-New-BSS Information Element (IE). Since this IE is optional, if the target BSS does not have any knowledge of the RR mode of the MS, it sends the DTM Information message.

The same essential procedures are envisaged for an inter-MSC handover. Current implementations are expected to be able to carry the extended Old-BSS-to-New-BSS IE without modifications to 3G TS 09.08. Likewise, no changes are foreseen for an inter-SGSN handover. The MS performs a Routing Area Update procedure in the new cell.

FIG. 2 is a signaling diagram illustrating the flow of messages involved in a Cell Update procedure performed on the main DCCH when the MS 11 is in CS dedicated mode, packet idle mode, and Ready state according to existing 3GPP standards. In this scenario, the MS has requested uplink resources, indicating "Cell Update", and the BSS 31 has commanded the MS to perform the Cell Update procedure in single timeslot operation. As shown, the MS is in CS dedicated mode 32 with the MSC 15, and sends GPRS Transparent Transport Protocol (GTTP) information 33 to the BSS 31 in a Logical Link Control Packet Data Unit (LLC PDU). The BSS then sends uplink UL-UNITDATA 34 in an LLC PDU to the SGSN 16 to complete the Cell Update procedure. As stated before, the processing involved at the BSS incurs extra delay that translates into a degraded QoS.

FIG. 3 is a signaling diagram illustrating the flow of messages involved in a Cell Update procedure performed on a temporary block flow (TBF) when the MS 11 is in CS dedicated mode, packet idle mode, and Ready state according to existing 3GPP standards. Once again, the MS has requested uplink resources, indicating "Cell Update". In this case, however, the BSS 31 has allocated an uplink TBF on a different time slot. The MS sends a DTM Request message 35 to the BSS, which returns a Packet Assignment Command 36. The MS then sends one or more Radio Link Control/Medium Access Control (RLC/MAC) blocks 37 to the BSS. The BSS then sends uplink UL-UNITDATA 34 to the SGSN 16 to complete the Cell Update procedure. As previously noted, this entire process may cause delays of several seconds for the PS communication, thus causing a significant loss of QoS during the process.

What is needed in the art is a method and BSC for reestablishing packet data services following a dual-mode handover that overcomes the disadvantages of the prior art.

The present invention provides a method and BSC that overcome the disadvantages of the prior art under a select set of scenarios.

SUMMARY

In one aspect, the present invention is directed to a method of reestablishing a packet data session when a mobile station, conducting both a circuit-switched call and a packet data session, is handed over from a serving base transceiver station (BTS) to a target BTS served by the same base station controller (BSC) in a GPRS/EDGE cellular radio telecommunication system. The method includes determining by the BSC that a handover of the mobile station from the serving BTS to the target BTS is imminent; sending from the BSC to the mobile station prior to a handover command, information needed by the mobile station to resume the packet data session in the target cell; handing over the mobile station from the serving BTS to the target BTS; reconnecting the circuit-switched call; and reestablishing the packet data session utilizing the information sent to the mobile station prior to the handover command.

In another aspect, the present invention is directed to a BSC in a GPRS/EDGE cellular radio telecommunication system for controlling a handover of a mobile station from a serving BTS to a target BTS served by the BSC, when the mobile station is conducting both a circuit-switched call and a packet data session. The BSC includes means for determining that a handover of the mobile station from the serving BTS to the target BTS is imminent; communication means for sending from the BSC to the mobile station prior to a handover command, information needed by the mobile station to resume the packet data session in the target cell; channel activation and release means for handing over the mobile station from the serving BTS to the target BTS; and means for reestablishing the packet data session after the circuit-switched call is reconnected, utilizing the information sent to the mobile station prior to the handover command.

In yet another aspect, the present invention is directed to a method of reestablishing a packet data session when a mobile station, conducting both a circuit-switched call through a mobile switching center (MSC) and a packet data session through a serving GPRS service node (SGSN), is handed over from a serving BTS to a target BTS served by the same BSC in a GPRS/EDGE cellular radio telecommunication system. The method includes determining by the BSC that a handover of the mobile station from the serving BTS to the target BTS is imminent; sending from the BSC to the mobile station prior to a handover command, information needed by the mobile station to resume the packet data session in the target cell; and handing over the mobile station from the serving BTS to the target BTS. The method also includes sending from the BSC to the SGSN, a pseudo cell update message when the handover is complete. The pseudo cell update message includes an identifier of the mobile station and appears to the SGSN to be a cell update message from the mobile station. This is followed by reconnecting the circuit-switched call; and reestablishing the packet data session utilizing the information sent to the mobile station prior to the handover command, and without sending a cell update message from the mobile station.

In still yet another aspect, the present invention is directed to a BSC in a GPRS/EDGE cellular radio telecommunication system for controlling a handover of a mobile station from a serving BTS to a target BTS served by the BSC, when the mobile station is conducting both a circuit-switched call through an MSC and a packet data session through an SGSN. The BSC includes means for determining that a handover of the mobile station from the serving BTS to the target BTS is imminent; communication means for sending from the BSC to the mobile station prior to a handover command, information needed by the mobile station to resume the packet data session in the target cell; and channel activation and release means for handing over the mobile station from the serving BTS to the target BTS. The BSC also includes communication means for sending from the BSC to the SGSN when the handover is complete, a pseudo cell update message, which includes an identifier of the mobile station and appears to the SGSN to be a cell update message from the mobile station. The BSC also includes means for reestablishing the packet data session utilizing the information sent to the mobile station prior to the handover command, and without sending a cell update message from the mobile station.

Lastly, the present invention provides a mobile station with means to announce its capability to handle a dual mode handover. Such an indication can be sent by the MS to the network as part of registration and update messages. One side effect of these means is that the mobile station can use knowledge of the base station's ability to send a pseudo cell update message and thereby avoid doing so itself. The indication also signals to the network the capability of the MS for faster handover, thereby providing the network the ability to negotiate a higher QoS for the transactions foreseen.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention provides procedures for more rapidly reestablishing a PS session in Dual Transfer Mode (DTM) following a handover in a GSM/EDGE network. The invention requires a minimum number of changes to the GSM/EDGE specification corresponding to Release 99 of the GSM/EDGE standard. The invention is applicable to handovers that occur within the same routing area, where the logical SGSN does not change after the handover. Two embodiments are discussed, both of which significantly reduce the time needed to resume a packet switched connection, primarily when the MS is in DTM mode.

Figure 1:
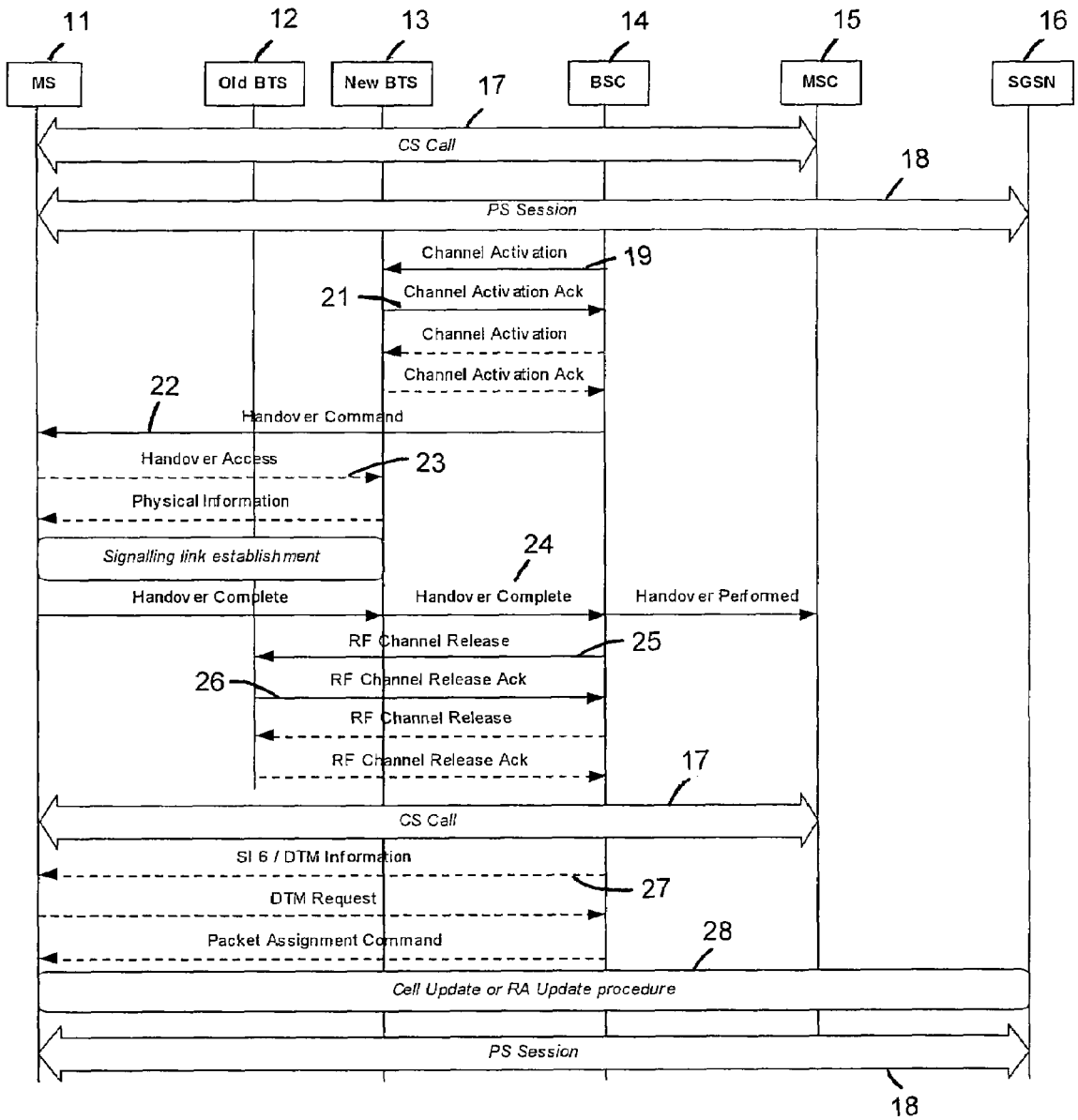
FIG. 1 (Prior Art) is a signaling diagram illustrating the flow of messages for an internal, dual mode handover in accordance with existing 3GPP standards.
Figure 2:
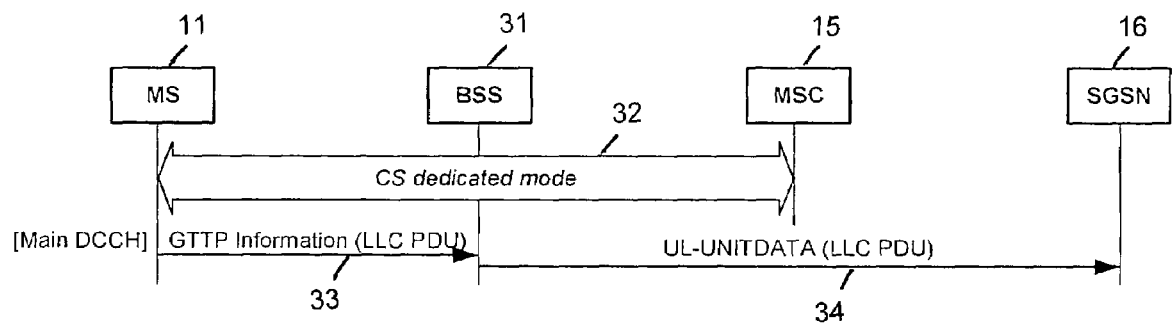
FIG. 2 (Prior Art) is a signaling diagram illustrating the flow of messages involved in a Cell Update procedure performed on the main digital control channel (DCCH) when the mobile station is in dedicated mode, packet idle mode and Ready state according to existing 3GPP standards.
Figure 3:
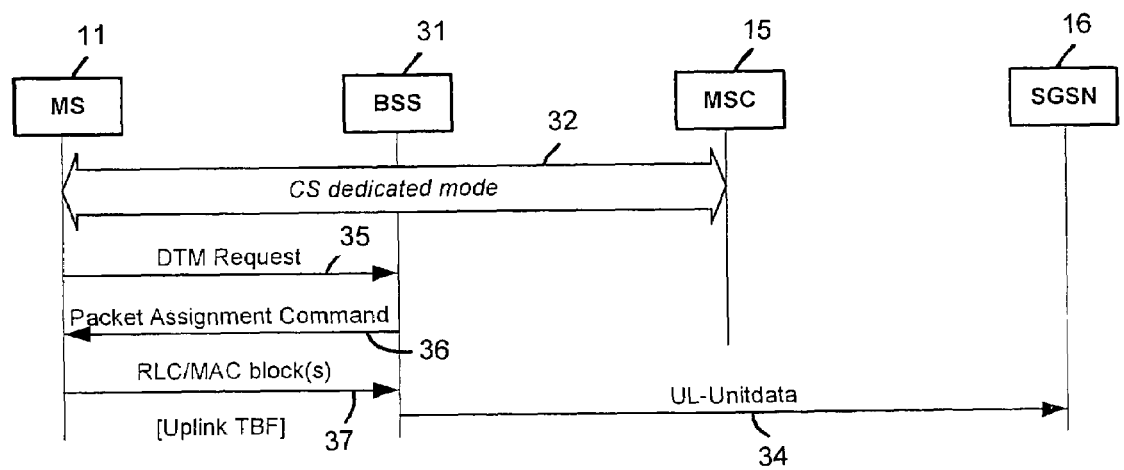
FIG. 3 (Prior Art) is a signaling diagram illustrating the flow of messages involved in a Cell Update procedure performed on a temporary block flow (TBF) when the mobile station is in dedicated mode, packet idle mode and Ready state according to existing 3GPP standards.
Figure 4:
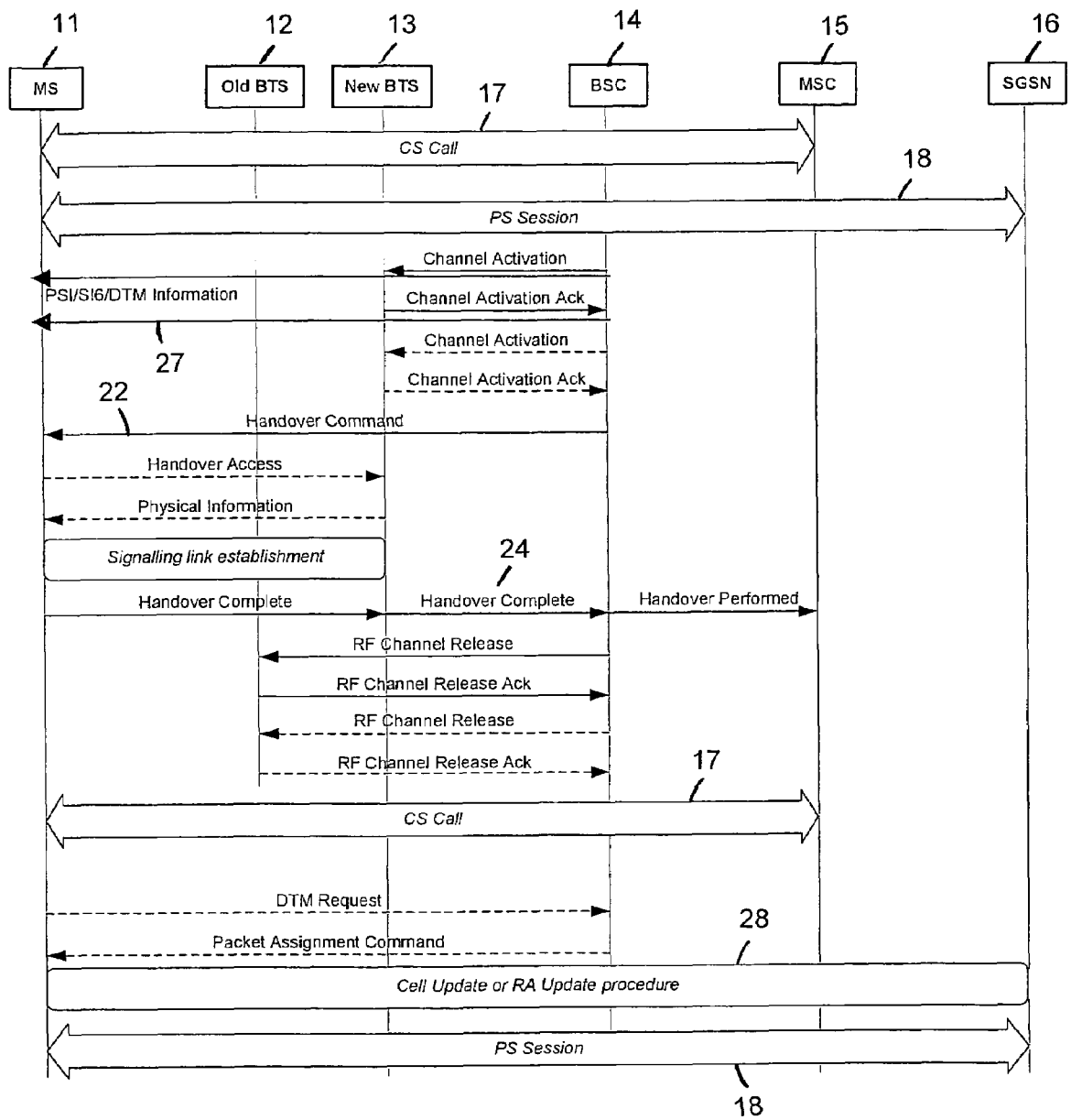
FIG. 4 is a signaling diagram illustrating the flow of messages for an internal, dual-mode handover in accordance with a first embodiment of the present invention.

FIG. 4 is a signaling diagram illustrating the flow of messages for an internal, dual-mode handover in accordance with a first embodiment of the present invention. This embodiment takes advantage of the fact that the BSC 14 knows that a handover in the circuit domain is imminent based on signal strength measurements from the BTSs 12 and 13 and measurement reports from the MS 11 in the CS domain. Therefore, rather than waiting until the CS call 17 is reconnected, the BSC sends the DTM Information message 27 to the MS, with information needed to resume the GPRS operation in the target cell, as soon as the BSC recognizes that a handover is imminent. Thus, the DTM Information message 27 is sent prior to sending the Handover Command 22, and the MS receives packet system information for the target cell over the MS's packet resources prior to handover. This significantly reduces the time needed to resume the PS session 18.

It is noted that the GSM/EDGE specification includes a procedure for Network Assisted Cell Change (NACC), in which packet system information for the target cell is sent to the MS 11 prior to handover when the MS is operating in pure PS mode. The present invention extends this procedure to DTM mode, which still suffers from extended delays of several seconds for reestablishing the PS communication. The sending of the packet system information for the target cell is triggered in the present invention by CS parameters at the BSC 14. In addition to packet system information, information relevant to DTM (SI6/DTM Information) in the target cell is also sent in the DTM message 27. Since the MS has all relevant system information after a handover, it does not need to receive packet system information before making the Cell Update 28 and resuming packet data transfer.

Figure 5:
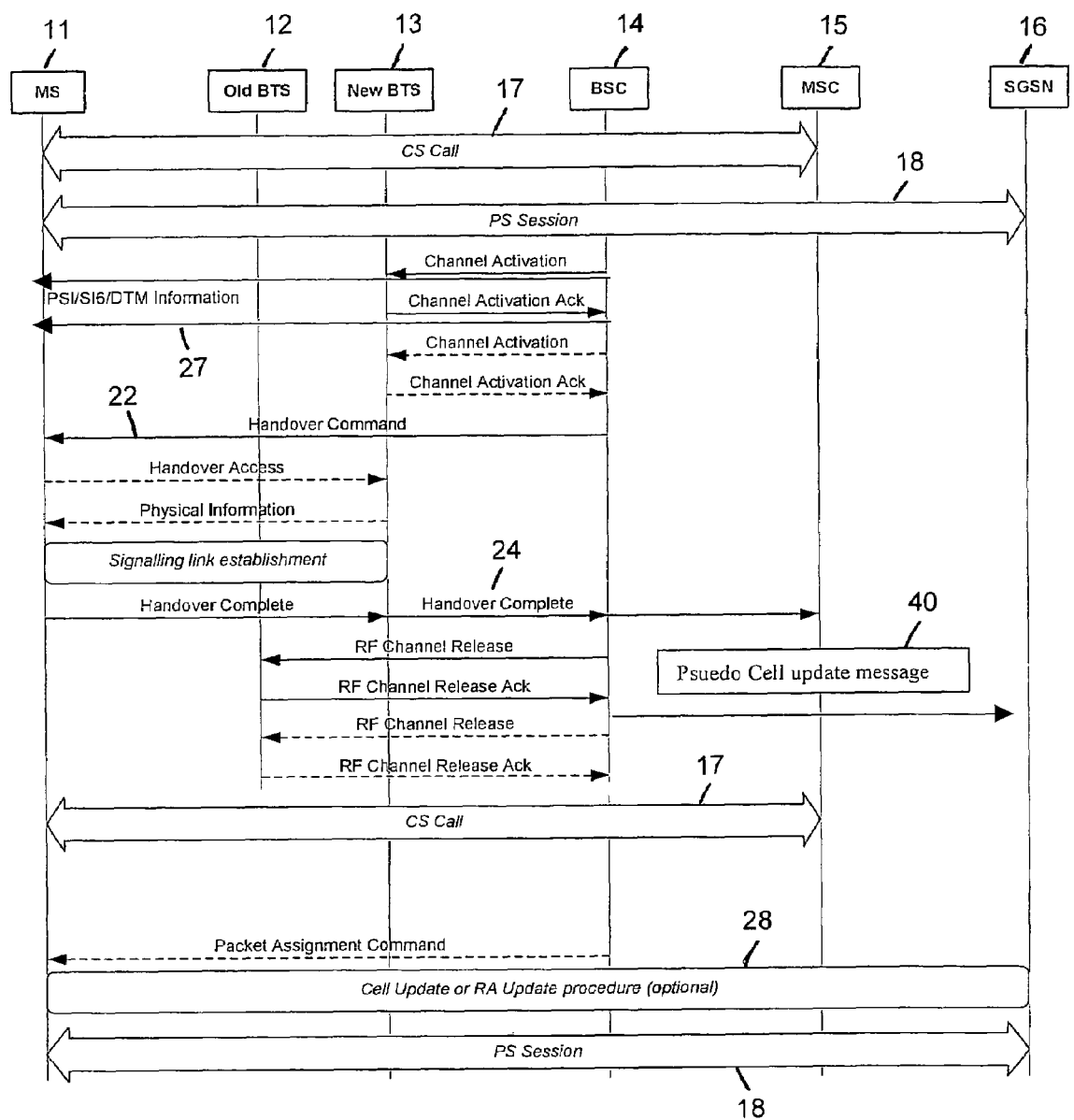
FIG. 5 is a signaling diagram illustrating the flow of messages for an internal, dual-mode handover in accordance with a second embodiment of the present invention.

FIG. 5 is a signaling diagram illustrating the flow of messages for an internal, dual-mode handover in accordance with a second embodiment of the present invention. In this embodiment, in addition to sending the DTM message 27 to the MS 11 prior to handover, the BSC 14 sends a pseudo Cell Update message 41 to the SGSN 16 on behalf of the MS, just as the MS completes the handover. The BSC knows that the MS has completed the handover from the Handover Complete message 24 sent by the MS to the new BTS 13. Based on this information, the BSC "spoofs" the SGSN by sending the pseudo Cell Update message 40 to the SGSN as if the message was a Cell Update message from the MS. This procedure eliminates the requirements for the BSC to send the DTM message to the MS and to receive a DTM Request message from the MS after the CS call is reconnected. This significantly reduces the time needed to resume the PS session 18.

The BSC 14 may notify the MS that the BSC is sending the pseudo-update message to the SGSN. With the MS's knowledge that the BSS will send the pseudo-update message to the SGSN, the MS does not need to send the (optional) cell update message 28 shown in FIG. 5 after a successful handover. This provides another significant reduction in the time needed to resume the PS session 18.

The second embodiment is applicable when the handover occurs within the same BSS, so that the BSC 14 knows the Temporary Link Layer Identifier (TLLI) of the MS 11 from earlier transactions (and keeps the information after the handover). The pseudo Cell Update message 40 requires that the MS send a null LLC frame to the SGSN 16. The BSC may add the TLLI as an identifier in, for example, the BSS GPRS Protocol (BSSGP) message that encapsulates the LLC message.

Either of the embodiments described earlier may include an option in which the MS announces its capability to execute a dual-mode handover to the network. In the GSM/EDGE network, the MS may announce that capability by, for example, setting a single bit via the MS Radio Access Capability information element that is defined in 3GPP TS 04.60. Of course other messages and/or information elements may also be used for this purpose and remain within the scope of the present invention. The description herein provides exemplary methods by which the MS may communicate its capability using suitable means either during registration or another suitable periodic procedure.

It is noted that the present invention provides for the seamless reestablishment of downlink packet data transfer during a handover without requiring the MS to proceed with a Cell Update. The invention also uses the existing DCCH to pre-supply the MS with the parameters needed for reestablishment of uplink data communication towards the packet domain after the circuit call is handed over. Additionally, the present invention provides the network with the capability to anticipate uplink resource needs on the MS's behalf so that seamless transfer of packet communication on the uplink can occur after handover of the circuit connection.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of reestablishing a packet data session when a mobile station, conducting both a circuit-switched call and a packet data session, is handed over from a serving base transceiver station (BTS) to a target BTS served by the same base station controller (BSC) in a GPRS/EDGE cellular radio telecommunication system, said method comprising:
   determining by the BSC that a handover of the mobile station from the serving BTS to the target BTS is imminent;
   sending from the BSC to the mobile station prior to a handover command, information needed by the mobile station to resume the packet data session in the target cell;
   handing over the mobile station from the serving BTS to the target BTS;
   sending from the BSC to a serving GPRS service node (SGSN), a pseudo-update message appearing to the SGSN to be a cell update message from the mobile station;
   reconnecting the circuit-switched call; and
   reestablishing the packet data session utilizing the information sent to the mobile station prior to the handover command;
   wherein the step of sending information to the mobile station needed to resume the packet data session in the target cell includes sending from the BSC to the mobile station, an indication that the BSC has sent a pseudo-update message to the SGSN; and
   wherein the step of reestablishing the packet data session includes reestablishing the packet data session without sending a cell update message from the mobile station.

2. The method of claim 1, wherein the step of determining by the BSC that a handover of the mobile station from the serving BTS to the target BTS is imminent includes determining that the handover is imminent based on signal strength measurement reports from the mobile station regarding the circuit-switched call.

3. The method of claim 1, wherein the step of sending information to the mobile station needed to resume the packet data session in the target cell includes sending both packet system information and Dual Transfer Mode (DTM) information relevant in the target cell.

4. The method of claim 1, further comprising as a first step, sending at least one message from the mobile station to a network element, said at least one message notifying the network element that the mobile station is capable of executing a dual-mode handover.

5. The method of claim 4, wherein the step of sending at least one message from the mobile station to the network element includes sending the at least one message to the BSC, notifying the BSC that the mobile station is capable of executing a dual-mode handover.

6. The method of claim 4, wherein the step of sending at least one message from the mobile station to the network element includes sending the at least one message to the SGSN, notifying the SGSN that the mobile station is capable of executing a dual-mode handover.

7. The method of claim 4, wherein the step of sending at least one message from the mobile station to the network element includes setting a field in an MS Radio Access Capability information element to indicate that the mobile station is capable of executing the dual-mode handover.

8. A base station controller (BSC) in a GPRS/EDGE cellular radio telecommunication system for controlling a handover of a mobile station from a serving base transceiver station (BTS) to a target BTS served by the BSC, wherein the mobile station is conducting both a circuit-switched call and a packet data session, said BSC comprising:
   means for determining that a handover of the mobile station from the serving BTS to the target BTS is imminent;
   communication means for:
     sending to a serving GPRS service node (SGSN), a pseudo-update message appearing to the SGSN to be a cell update message from the mobile station; and
     sending from the BSC to the mobile station prior to a handover command, information needed by the mobile station to resume the packet data session in the target cell, said information including an indication that the BSC has sent the pseudo-update message to the SGSN;
   channel activation and release means for handing over the mobile station from the serving BTS to the target BTS; and
   means for reestablishing the packet data session after the circuit-switched call is reconnected, utilizing the information sent to the mobile station prior to the handover command, and without receiving a cell update message from the mobile station.

9. The BSC of claim 8, wherein the means for determining that a handover of the mobile station from the serving BTS to the target BTS is imminent includes means for determining that the handover is imminent based on signal strength measurement reports from the mobile station regarding the circuit-switched call.

10. The BSC of claim 8, wherein the communication means includes means for sending both packet system information and Dual Transfer Mode (DTM) information relevant in the target cell to the mobile station prior to the handover command.

11. The BSC of claim 8, wherein the communication means also includes means for receiving from the mobile station, at least one message notifying the BSC that the mobile station is capable of executing a dual-mode handover.

12. The BSC of claim 11, wherein the communication means also includes means for determining whether the mobile station is capable of executing the dual-mode handover by analyzing a field set in an MS Radio Access Capability information element received from the mobile station.

13. A method of reestablishing a packet data session when a mobile station, conducting both a circuit-switched call through a mobile switching center (MSC) and a packet data session through a serving GPRS service node (SGSN), is handed over from a serving base transceiver station (BTS) to a target BTS served by the same base station controller (BSC) in a GPRS/EDGE cellular radio telecommunication system, said method comprising:
  determining by the BSC that a handover of the mobile station from the serving BTS to the target BTS is imminent;
  sending from the BSC to the mobile station prior to a handover command information needed by the mobile station to resume the packet data session in the target cell;
  handing over the mobile station from the serving BTS to the target BTS;
  sending from the BSC to the SGSN, a pseudo cell update message when the handover is complete, said pseudo cell update message including an identifier of the mobile station and appearing to the SGSN to be a cell update message from the mobile station;
  reconnecting the circuit-switched call; and
  reestablishing the packet data session utilizing the information sent to the mobile station prior to the handover command.

14. The method of claim 13, wherein the step of determining by the BSC that a handover of the mobile station from the serving BTS to the target BTS is imminent includes determining that the handover is imminent based on signal strength measurement reports from the mobile station regarding the circuit-switched call.

15. The method of claim 13, wherein the step of sending information to the mobile station needed to resume the packet data session in the target cell includes sending both packet system information and Dual Transfer Mode (DTM) information relevant in the target cell.

16. The method of claim 13, further comprising as a first step, sending at least one message from the mobile station to a network element, said at least one message notifying the network element that the mobile station is capable of executing a dual-mode handover.

17. The method of claim 16, wherein the step of sending at least one message from the mobile station to the network element includes sending the at least one message to the BSC, notifying the BSC that the mobile station is capable of executing a dual-mode handover.

18. The method of claim 17, further comprising notifying the SGSN by the BSC that the mobile station is capable of executing a dual-mode handover, thereby enabling negotiation of a higher quality of service for the mobile station.

19. The method of claim 16, wherein the step of sending at least one message from the mobile station to the network element includes sending the at least one message to the SGSN, notifying the SGSN that the mobile station is capable of executing a dual-mode handover.

20. The method of claim 16, wherein the step of sending at least one message from the mobile station to the network element includes setting a field in an MS Radio Access Capability information element to indicate that the mobile station is capable of executing the dual-mode handover.

21. The method of claim 16, wherein the step of reestablishing the packet data session utilizing the information sent to the mobile station prior to the handover command is performed without sending a cell update message from the mobile station to the SGSN.

22. A base station controller (BSC) in a GPRS/EDGE cellular radio telecommunication system for controlling a handover of a mobile station from a serving base transceiver station (BTS) to a target BTS served by the BSC, wherein the mobile station is conducting both a circuit-switched call through a mobile switching center (MSC) and a packet data session through a serving GPRS service node (SGSN), said BSC comprising:
  means for determining that a handover of the mobile station from the serving BTS to the target BTS is imminent;
  first communication means for sending from the BSC to the mobile station prior to a handover command, information needed by the mobile station to resume the packet data session in the target cell;
  channel activation and release means for handing over the mobile station from the serving BTS to the target BTS;
  second communication means for sending from the BSC to the SGSN when the handover is complete, a pseudo cell update message, said pseudo cell update message including an identifier of the mobile station and appearing to the SGSN to be a cell update message from the mobile station; and
  means for reestablishing the packet data session utilizing the information sent to the mobile station prior to the handover command.

23. The BSC of claim 22, wherein the means for determining that a handover of the mobile station from the serving BTS to the target BTS is imminent includes means for determining that the handover is imminent based on signal strength measurement reports from the mobile station regarding the circuit-switched call.

24. The BSC of claim 22, wherein the first communication means includes means for sending to the mobile station, both packet system information and Dual Transfer Mode (DTM) information relevant in the target cell.

25. The BSC of claim 22, wherein the second communication means sends the pseudo cell update message to the SGSN when the BSC receives a Handover Complete message from the target BTS.

26. The BSC of claim 22, wherein the second communication means includes means for placing in the pseudo cell update message, a Temporary Link Layer Identifier (TLLI) for the mobile station.

27. The BSC of claim 22, wherein the first communication means also includes means for receiving from the mobile station, at least one message notifying the BSC that the mobile station is capable of executing a dual-mode handover.

28. The BSC of claim 27, wherein the first communication means also includes means for determining whether the mobile station is capable of executing the dual-mode handover by analyzing a field set in an MS Radio Access Capability information element received from the mobile station.

29. The BSC of claim 27, wherein the second communication means also includes means for notifying the SGSN that the mobile station is capable of executing a dual-mode handover, thereby enabling negotiation of a higher quality of service for the mobile station.

30. A mobile station for conducting both a circuit-switched call through a mobile switching center (MSC) and a packet data session through a serving GPRS service node (SGSN) in a GPRS/EDGE cellular radio telecommunication system, said cellular radio telecommunication system including a base station controller (BSC) for controlling a handover of the mobile station from a serving base transceiver station (BTS) to a target BTS serving a target cell, said mobile station comprising:

communication means for:
  receiving from the BSC when the handover is imminent, information needed by the mobile station to resume the packet data session in the target cell, and then receiving a handover command; and
  sending at least one message to a network element notifying the network element that the mobile station is capable of executing a dual-mode handover;
means responsive to the handover command, for executing the handover from the serving BTS to the target BTS;
means for reestablishing the circuit-switched call following the handover; and
means responsive to reestablishment of the circuit-switched call, for reestablishing the packet data session utilizing the information sent to the mobile station prior to the handover command;

wherein the communication means also receives from the BSC, an indication that the BSC has sent a pseudo-update message to the SGSN, and in response, the means for reestablishing the packet data session reestablishes the packet data session without sending a cell update message from the mobile station.

31. The mobile station of claim 30, wherein the communication means receives from the BSC, both packet system information and Dual Transfer Mode (DTM) information relevant in the target cell.

32. The mobile station of claim 30, wherein the means for sending at least one message to a network element includes means for sending the at least one message to the BSC, notifying the BSC that the mobile station is capable of executing a dual-mode handover.

33. The mobile station of claim 30, wherein the means for sending at least one message to a network element includes means for sending the at least one message to the SGSN, notifying the SGSN that the mobile station is capable of executing a dual-mode handover.

34. The mobile station of claim 30, wherein the means for sending at least one message to the network element includes means for setting a field in an MS Radio Access Capability information element to indicate that the mobile station is capable of executing the dual-mode handover.

* * * * *